US011925857B2

(12) United States Patent
Jain et al.

(10) Patent No.: US 11,925,857 B2
(45) Date of Patent: Mar. 12, 2024

(54) DEVICE AND METHOD FOR INTEGRATING SCENT INTO VIRTUAL REALITY ENVIRONMENT

(71) Applicant: INTERNATIONAL FLAVORS & FRAGRANCES INC., New York, NY (US)

(72) Inventors: Anshul Jain, East Brunswick, NJ (US); Lalit K. Damodaran, Newark, NJ (US); Aleksey I. Dumer, Elizabeth, NJ (US); Matthias Horst Tabert, Arveme, NY (US)

(73) Assignee: INTERNATIONAL FLAVORS & FRAGRANCES INC., New York, NY (US)

( * ) Notice: Subject to any disclaimer, the term of this patent is extended or adjusted under 35 U.S.C. 154(b) by 0 days.

(21) Appl. No.: 18/096,398

(22) Filed: Jan. 12, 2023

(65) Prior Publication Data

US 2023/0166181 A1    Jun. 1, 2023

Related U.S. Application Data

(63) Continuation of application No. 17/569,456, filed on Jan. 5, 2022, now abandoned, which is a continuation
(Continued)

(51) Int. Cl.
*A63F 13/25*     (2014.01)
*G05B 15/02*     (2006.01)
(Continued)

(52) U.S. Cl.
CPC .............. *A63F 13/25* (2014.09); *G05B 15/02* (2013.01); *G06F 3/013* (2013.01); *G06F 3/015* (2013.01);
(Continued)

(58) Field of Classification Search
CPC ......... G06F 3/013; G06F 3/015; G05B 15/02; G06Q 30/0277; A63F 13/25; A63F 2300/8082
See application file for complete search history.

(56) References Cited

U.S. PATENT DOCUMENTS 5,454,122 A    10/1995    Bergeron
6,409,599 B1    6/2002    Sprout
(Continued)

FOREIGN PATENT DOCUMENTS

CN    204203647 U    3/2015
CN    104881123 A    9/2015
(Continued)

OTHER PUBLICATIONS

Carulli et al., "Integrating Scents Simulation in Virtual Reality Multisensory Environment for Industrial Products Evaluation", Computer-Aided Design and Applications 13(3), 2016, pp. 320-328.
(Continued)

*Primary Examiner* — Phi Hoang (57) ABSTRACT

A system and method for evaluating a fragrance product or object provided, wherein the system includes a virtual reality component configured to present a user with a product or object in a virtual reality environment; an optional biometric sensor component configured to obtain the user's biometric data; a wearable scent delivery component configured to deliver a scent to the user; and a digital controller component that synchronizes deliver of the scent with the user's interaction with the product or object in the virtual reality environment.

14 Claims, 4 Drawing Sheets

Related U.S. Application Data of application No. 16/970,026, filed as application No. PCT/US2019/017957 on Feb. 14, 2019, now abandoned.

(60) Provisional application No. 62/632,678, filed on Feb. 20, 2018.

(51) Int. Cl.
*G06F 3/01* (2006.01)
*G06Q 30/0241* (2023.01)

(52) U.S. Cl.
CPC .. *G06Q 30/0277* (2013.01); *A63F 2300/8082* (2013.01)

(56) References Cited

U.S. PATENT DOCUMENTS

| | | | |
|---|---|---|---|
| 7,154,579 B2 | 12/2006 | Selander | |
| 7,484,716 B2 | 2/2009 | Morie | |
| 8,293,170 B1 | 10/2012 | Schuld | |
| 8,295,529 B2 | 10/2012 | Petersen | |
| 8,321,797 B2 | 11/2012 | Perkins | |
| 2005/0244307 A1 | 11/2005 | Gygax | |
| 2008/0065468 A1 | 3/2008 | Berg | |
| 2010/0205043 A1 | 8/2010 | Edwards | |
| 2014/0164056 A1 | 6/2014 | Johnson | |
| 2014/0377130 A1 | 12/2014 | Edwards | |
| 2015/0085279 A1 | 3/2015 | Balooch | |
| 2017/0168303 A1 | 6/2017 | Petrov | |
| 2017/0274279 A1 | 9/2017 | Fateh | |
| 2017/0361133 A1 | 12/2017 | Yu | |
| 2018/0071425 A1 | 3/2018 | Jin | |
| 2018/0107268 A1* | 4/2018 | Crandall | G06T 19/003 |
| 2018/0173308 A1 | 6/2018 | Smith | |
| 2018/0286269 A1 | 10/2018 | Lechner | |
| 2018/0328917 A1 | 11/2018 | Ilan | |
| 2019/0262739 A1* | 8/2019 | Reichow | A63J 5/00 |
| 2019/0325774 A1* | 10/2019 | McLeod | G09B 19/24 |
| 2020/0334837 A1* | 10/2020 | Feigl | G06T 7/248 |

FOREIGN PATENT DOCUMENTS

| | | | |
|---|---|---|---|
| CN | 204666955 | U | 9/2015 |
| CN | 205379594 | U | 7/2016 |
| JP | 4677633 | B2 | 4/2011 |
| KR | 101207070 | B1 | 11/2012 |
| KR | 20140113222 | A | 9/2014 |
| WO | 1998018048 | A1 | 4/1998 |
| WO | 2012093246 | A1 | 7/2012 |
| WO | 2016164917 | A1 | 10/2016 |

OTHER PUBLICATIONS

Coyle et al., "Computerized and Virtual Reality Cognitive Training for Individuals at High Risk of Cognitive Decline: Systematic Review of the Literature", Am. J. Geriatr. Psych. 23(4), 2015, pp. 335-359.

Gerigk et al., Oral presentation, Pangborn Symposium, Aug. 21, 2017.

Hemmerling et al., Poster presentation, Pangborn Symposium, Aug. 21, 2017.

Ischer et al., "How Incorporation of Scents Could Enhance Immersive Virtual Experiences", Front. Psychol. 5, 2014, pp. 736.

Lichters et al., Poster presentation, Pangborn Symposium, Aug. 21, 2017.

Moore et al., "The Effects of Olfaction on Training Transfer for an Assembly Task", 2015 IEEE Virtual Reality (VR), Aries, Camargue, Provence, France, 2015, pp. 237-238.

Munyan et al., "Olfactory Stimuli Increase Presence in Virtual Environments", PLOS One, 11 (6), 2016, e0157568.

Nakamoto, "Odor Sensing System and Olfactory Display", Yakugaku Zasshi, 134(3), 2014, pp. 333-338.

Tortell et al., "The effects of scent and game play Experience on memory of a virtual environment", Virtual Reality, 11(1), 2007, pp. 61-68.

International Search Report and Written Opinion in PCT/US2019/017957, dated Jun. 14, 2019.

International Preliminary Report on Patentability in PCT/US2019/017957, dated Mar. 4, 2020.

* cited by examiner

DEVICE AND METHOD FOR INTEGRATING SCENT INTO VIRTUAL REALITY ENVIRONMENT

INTRODUCTION

This application is a continuation of U.S. patent application Ser. No. 17/569,456, filed on Jan. 5, 2022, which is a continuation of U.S. patent application Ser. No. 16/970,026, filed on Aug. 14, 2020, which is a National Stage Application under 35 U.S.C. 371 of PCT International Application Serial No. PCT/US2019/017957, filed Feb. 14, 2019, which claims the benefit of priority to U.S. Provisional Patent Application Ser. No. 62/632,678, filed Feb. 20, 2018, the contents of each of which are incorporated herein by reference in their entirety.

BACKGROUND

Virtual reality (VR) has rapidly evolved over the past years. While entertainment and gaming remain the primary objectives of VR usage, VR has been suggested for other purposes such as skill acquisition (e.g., flying a plane), cognitive training, or achievement of emotional wellness (e.g., overcoming a phobia). VR experiences are primarily created by means of visual and auditory stimulation. While introduction of scent into the VR environment has been suggested, the integration of scent has been limited by several drawbacks.

A multisensory experience occurs when more than one sense modality is stimulated at nearly the same time. In this respect, successful scent integration requires that the onset and duration of odorant delivery are precisely controlled. However, scent display devices described for use in conjunction with VR are not compatible with most VR environments because they lack precise control over the timing of release and other delivery parameters. See CN 104881123 A and U.S. Pat. No. 8,295,529 B2. For this reason, the usability of such systems is limited to static VR environments where the VP user's experiences and actions are constrained and unfold according to a predetermined script, such as welding (see KR 2014113222 A), running on a treadmill (CN 205379594 U), or looking at a commercial product (Carulli, et al. (2016) *Computer-Aided Design and Applications* 13(3):320-328). However, these scent display devices do not allow synchronizing scent delivery with events that are widely varied and cannot be predicted in advance. This precludes successful scent integration into more natural VR environments that are necessary for simulating real human experience. Non-wearable or heavy scent display devices prevent or constrain the VR user's movement. As such, these devices are not suitable to any VR environment that allows the user to walk and explore. For example, the stationary VR systems described by Ischer, et al. ((2014) *Front. Psychol.* 5:736) and WO 1998/018048 tethers the user to a stationary bank of odorants, thereby constraining the user to a relatively small area. Similarly, a scent display device composed of heavy glass vials makes prolonged movement uncomfortable (Nakamoto (2014) *Yakugaku Zasshi* 134:333-338).

VR environments have been combined with scent for entertainment, gaming and cognitive training (Coyle, et al. (2015) *Am. J. Geriatr. Psych.* 23(4):335-59; Moore, et al. (2015) *In Virtual Reality (VR)*, 2015 *IEEE*, pp. 237-238; Munyan, III, et al. (2016) *PLOS One* 11(6):e0157568; Tortell, et al. (2007) *Virtual Reality* 11(1):61-8; CN 204666955 U; CN 204203647 U; KR 201328346 A; KR 101207070 B1; JP 4677633 B2; WO 2012/093246 A1; WO 2016/164917 A1; U.S. Pat. Nos. 6,409,599; 7,484,716). Further, an immersive VR environment with scent has been suggested for the evaluation of fragranced consumer products (Gerigk, et al. (Aug. 21, 2017) Oral presentation, *Pangborn Symposium*; Hemmerling, et al. (Aug. 21, 2017) Poster presentation, *Pangborn Symposium*; Lichters, et al. (Aug. 21, 2017) Poster presentation, *Pangborn Symposium*; US 2015/0085279 A1). However, none of the existing studies have used temporally precise scent delivery methods that rely or measuring biometric signals (e.g., respiration cycle, heart-rate) and user's interaction with the virtual environment (e.g., proximity to virtual object, movement, gaze direction) to control scent delivery.

U.S. Pat. No. 7,154,579 discloses a system composed of a fragrance generator and fragrance delivery system adapted for use with video or computer game involving snorts or other action stimulations in which the user is immersed in a virtual or near-virtual experience. This reference teaches that the fragrance delivery system may emit short bursts of fragrance at prescribed time to enhance the experience of a game, movie or similar audiovisual presentation. However, it is noted that this reference does not suggest a biometric sensor component.

US 2014/0164056 discloses a biosensitive response evaluation system including a 3D simulator that generates a virtual reality simulation to improve the overall nature of a marketing stimulus presented to consumers. This reference teaches the use of a biosensitive response evaluation system, which provides time-coded and synchronized data pertaining to a respondent's biometric state at the same time certain aroma events are occurring. However, it is noted that this reference does not suggest a scent delivery system.

US 2008/0065468 discloses a method of conducting consumer research by providing at least one visual stimulus to a consumer, e.g., via virtual reality goggles or helmet; measuring the consumer's response to the at least one visual stimulus with an eye-tracking apparatus; measuring the consumer's response to the at least one visual stimulus with a physiological apparatus; converting the measured physiological data to a probable emotive state of the consumer; and synchronizing said converted physiological data and the measured eye-tracking data. This reference teaches that a non-visual stimulus (e.g., smell, sound, and the like) may be substituted for the visual stimulus or presented concurrently/concomitantly with the visual stimulus. However, it as noted that this reference does not suggest a scent delivery system.

U.S. Pat. No. 8,321,797 discloses methods, apparatuses, and articles of manufacture for generating and using virtual reality simulations to conduct market research and related activities. The system includes a virtual reality display platform configured to present a simulation participant with the virtual reality stimulation, and a configurable physical mock-up environment, wherein the physical mock-up environment is configured to correspond to the environment simulated by the virtual reality simulation and to allow the simulation participant to interact with a product prototype corresponding to the product included in the virtual reality simulation. The virtual reality display platform can include a number of components used to provide a simulation participant with an immersive virtual environment including an aroma device to enhance the quality of a virtual reality simulation.

US 2010/0205043 describes a virtual reality system that includes one or more instrumented devices used to present a virtual shopping environment to a simulation participant. The participant's interactions with the virtual shopping environment may be used to conduct market research into the consumer decision making process. The simulation may allow the user to navigate through the virtual shopping environment with the instrumented device. In some embodiments, scents may be introduced to further increase the realistic quality of the virtual reality simulation. However, it is noted that this reference does not suggest a scent delivery system.

WO 2016/164917 describes a system that can add the sense of smell to virtual, mixed or augmented reality or holographic applications such as virtual shopping, simulations, engineering or scientific design, therapy, training, remote education, social interaction and other, interactivity, entertainment or other media. Certain embodiments of the system include various biosensors for dynamic adjustment of scent delivery parameters. Examples of such adjustments include speech recognition for scent delivery, three-dimensional scent delivery, scent sharing, haptic activated scent delivery, responsive scent adjustments, contextual scent selection and creation. However, it is noted that this reference does not suggest dynamic adjustments to virtual environment that are dependent on the user's biometric data.

WO 1998/018048 discloses a system comprised of a fragrance dispenser, a virtual reality headset, and a breath sensor. The breath sensor includes an electronics module that provides breath feedback signals to a computer that controls the precision fragrance dispenser. However, it is noted that biometric data in this system is limited to respiration, and that the breath sensor controls scent delivery but not the visual images of the virtual environment.

U.S. Pat. No. 7,154,579 discloses a system composed of a fragrance generator (100) and fragrance delivery system (200) adapted for use with video or computer game involving sports or other action stimulations in which the user is immersed in a virtual or near-virtual experience. This reference teaches that the fragrance delivery system may be wearable and emits short bursts of fragrance at the appropriate synchronized time to enhance the experience of a game, movie or similar audiovisual presentation. However, it is noted that this reference does not suggest a biometric sensor component.

US 2014/0164056 and US 2010/0205043 disclose systems enabling virtual reality simulations to improve the overall nature of a marketing stimulus, including aromas, that is presented to consumers. The described simulations expand the shopping environment, allowing the user to experience a 3D effect and/or to navigate through the virtual shopping environment with the instrumented device. To gauge the user's reaction to the marketing stimuli, biometric data is collected and analyzed. However, it is noted that biometric data in these systems is not used for the adjustment of scent delivery or of the virtual environment.

US 2008/0065468 discloses a method of conducting consumer research by using virtual reality goggles or helmet to provide visual stimulus to a consumer; measuring the consumer's response to the stimulus with eye-tracking and physiological apparatuses; and converting the measured physiological data to a probable emotive state of the consumer; and synchronizing said converted physiological data and the measured eye-tracking data. In one embodiment, a non-visual stimulus (e.g., smell, sound, and the like) replaces, or is presented simultaneously with, the visual stimulus. The visual stimuli can include consumer products or a physical activity such as using a consumer product. The reference also teaches that a company or researcher can use the synchronized data as feedback to control and/or manipulate a consumer's affective or emotive reaction or response towards the stimulus. However, it is noted that the reference does not suggest using the data to modulate scent delivery or the virtual reality environment.

U.S. Pat. No. 8,321,797 discloses methods, apparatuses, and articles of manufacture for generating and using virtual reality simulations to conduct market research and related activities. The system includes a virtual reality display platform and a configurable physical mock-up environment. While the simulation participant interacts with a product prototype in the physical environment, they are presented with the virtual image of the corresponding product via the virtual reality display. By simultaneously stimulating the user's senses with virtual and non-virtual environments, the system enables market researcher to provide the participant with a realistic simulation of interaction with a product. Feedback obtained from the participant can include verbal, as well as physiological or other non-verbal response. However, it is noted that this feedback is not used to alter virtual reality or trigger or modify scent delivery.

SUMMARY OF THE INVENTION

This invention is a system including (a) a virtual reality component (e.g., a virtual reality headset) configured to present a user with a product or object in a virtual reality environment; (b) a wearable scent delivery component configured to deliver a scent to the user, e.g., in a plume directed at the user's nose; and (c) digital controller component in communication with (a) and (b), wherein said digital controller component synchronizes delivery of the scent with pre-specified events in the virtual reality environment. In some embodiments, the digital controller delivers the scent based on the user's interaction with the product or object in the virtual reality environment, and optionally provides feedback to the digital controller component thereby altering the virtual reality environment and a scent delivery parameter. In certain embodiments, the system further includes one or more biometric sensor components configured to obtain the user's biometric data. In particular embodiments, the one or more biometric sensor components include a respiration sensor, an electro-dermal activity (EDA) sensor, a photoplethysmography (PPG) sensor, an electrocardiography (ECG) sensor, an electroencephalography (EEG) sensor, an electromyography (EMG) sensor, an eye-tracker, an accelerometer, a gyroscope, and/or a temperature sensor. In embodiments pertaining to the use of a respiration sensor, said sensor may detect changes in direction and intensity of airflow in the user's nose to trigger scent delivery at onset of an inhalation phase. In one embodiment, the wearable scent delivery component is detachably fixed to the virtual reality headset. In another embodiments, the wearable scent delivery component includes a detachable scent cartridge; includes an adjustable arm for positioning directly below the user's nose; and/or is an article worn on the user's neck.

This invention is also a method for evaluating a fragrance product or object by (a) presenting a virtual fragrance product or object to a user in a virtual reality environment; (b) collecting biometric data from the user while presenting the virtual fragrance product or object to the user; (c) delivering a scent to the user, wherein scent delivery is synchronized with the user's interaction with the virtual fragrance product or object in the virtual reality environment; (d) delivering a scent to the user, wherein scent delivery is synchronized with the user's position in relation to the virtual fragrance product or object in the virtual reality environment; (e) delivering a scent to the user, wherein scent delivery is synchronized with changes in the user's physiological state; and (f) delivering a scent to the user, wherein scent delivery is synchronized with time of day or time that elapsed since the start of the user's experience in the virtual reality environment.

A method for introducing as another sensory dimension to a virtual reality environment is also provided, which includes the steps of providing a system of the invention to a virtual reality movie, advertisement or gaming experience; and delivering a scent to the user at a pre-specified event in the virtual reality environment.

A method for evaluating consumer behavior is further provided, which includes the steps of providing a system of the invention in a virtual reality environment; delivering a scent to the user at a pre-specified event in the virtual reality environment; and obtaining the user's biometric data in response to the scent.

BRIEF DESCRIPTION OF THE DRAWINGS

FIG. 2A to FIG. 2C show embodiments of the scent delivery component.

DETAILED DESCRIPTION OF THE INVENTION

A system and method to display multiple discrete scents, alone and as mixtures, has now been developed, which is completely synchronized with Virtual Reality (VR) content via a digitally enabled scent delivery component. The scent delivery and synchronization are provided by seamless communication (e.g., via an algorithm using Java and Unity software platforms) between the digital scent device and VP environment. In the system and method, a scent(s) is automatically released when a user directs his or her gaze, or moves, or leans towards a virtual target object (e.g., fruit bowl, virtual fragrance molecule) displayed within an immersive 3D-360 virtual environment. Alternatively, a scent(s) is released by a moving virtual object (e.g., runway model) as it comes within proximity to the user. The scent delivery component and algorithm enable precise control over the amount, location, onset, and offset of each scent delivery thereby minimizing unintended cross-contamination of the scents that are displayed during a VR experience. The scent is delivered at an optimal distance from the user's nose, and the algorithm can easily be extended to incorporate triggers from the user such as respiration cycle or other biometric signals to further minimize cross-contamination and enhance VR experience.

Figure 1:
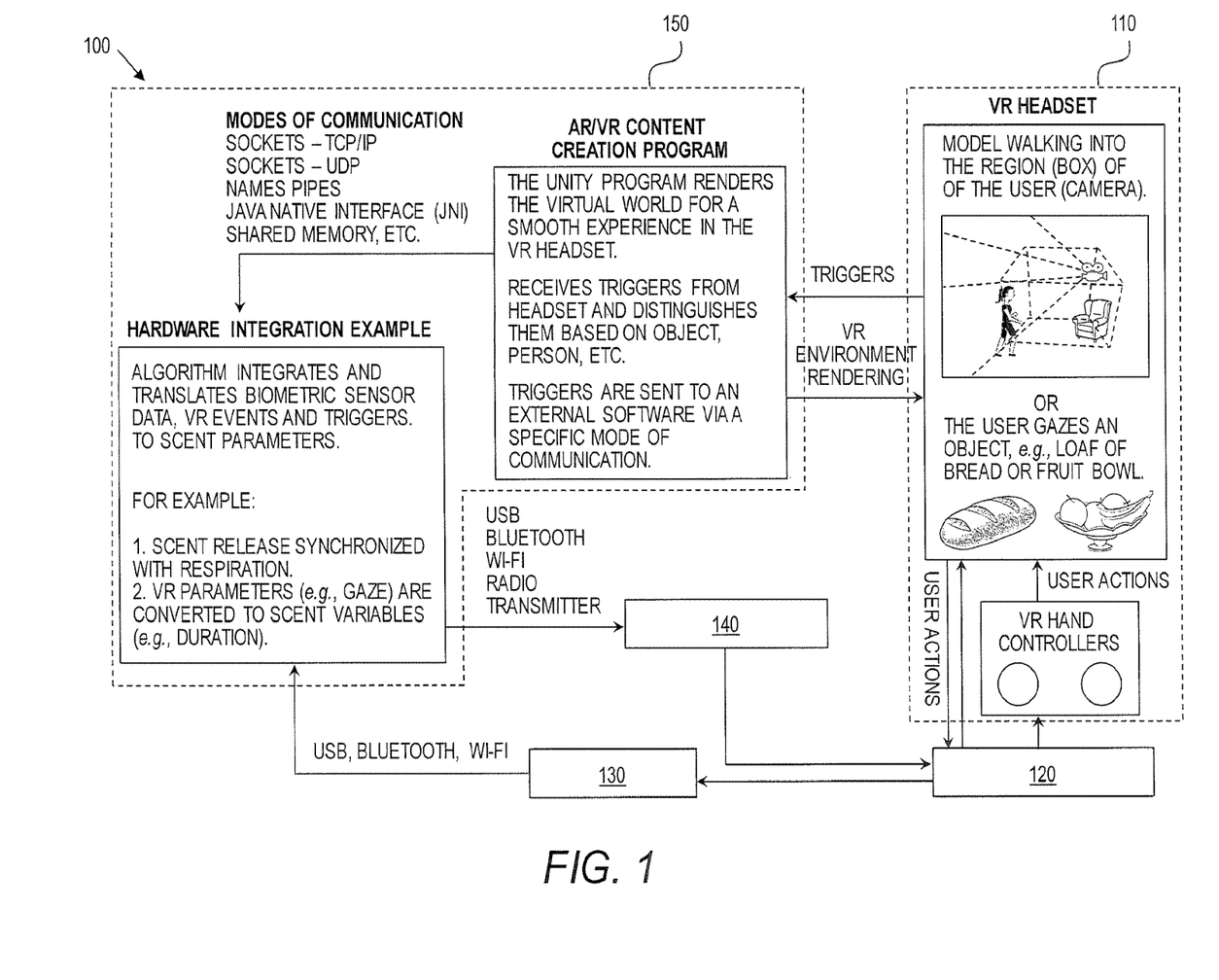
FIG. 1 illustrates a system of the invention.

With reference to FIG. 1, the system (100) of this invention provides a virtual reality component (110) configured to present a user (120) with a product or object in a virtual reality environment; an optional biometric sensor component (130) configured to obtain the user's biometric data; a wearable scent delivery component (140) configured to deliver a scent to the user; and a digital controller component (150) in communication with the virtual reality component (110), the optional biometric sensor component (130) and the wearable scent delivery component (140), wherein said digital controller component alters the virtual reality environment and/or initiates or stops scent delivery (or alters scent delivery parameters) depending on one or more of the following: (1) the user's interaction with the product or object in the virtual reality environment, (ii) the user's location in the virtual reality environment, (iii) the users' movement in the virtual reality environment, (iv) time spent by the user in the virtual reality environment, and/or (v) the user's biometric data.

Virtual Reality Component

The term "virtual reality" as used herein is defined as a computer-simulated environment that can simulate physical presence in places in the real world or imagined worlds. Virtual reality could recreate sensory experiences, including virtual taste, sight, smell, sound, touch, and the like. Many traditional VR systems use a near eye display for presenting a 3D virtual environment. The term "near eye display" refers to a device which includes wearable projected displays, usually stereoscopic in the sense that each eye is presented with a slightly different field of view to create the 3D perception. For the purposes of this invention, virtual reality is also intended to include augmented reality (AR) and mixed reality (MR) platforms. These platforms can include a live direct or indirect view of a physical, real-world environment whose elements are augmented (or supplemented) by computer-generated sensory input such as sound, video, graphics or GPS data.

The virtual reality (VR) component of this invention is a device including a VR headset and VR sensors (i.e., VR hand controllers and other sensors). The VR headset, sometimes referred to as goggles, is a wrap-around visual interface to display computer output. Commonly the computer displayed information is presented as a three-dimensional representation of real-world environments. In certain aspects of this invention, the computer displays a product or object, e.g., container, flower, consumer product, etc., to a user. The goggles may or may not include optics beyond the mere structure for holding the computer display (possibly in a form of a smartphone). The VR headset rests securely on the VR user's head, such that the monitor is immediately in front of the user's eyes. The VR sensors track the position of the user in the VR environment and send this information to the digital controller component for processing. In some embodiments, sensors, e.g., those that track the user's position, are integrated into the VR headset. In other embodiments, the sensors are attached to the user as stand-alone devices.

The VR sensors of the virtual reality component can include sensors that track the user's position and/or track the user's actions (e.g., reaching for or leaning toward a virtual object). Sensors that track the user's actions can be attached to the user's extremities or held in the user's hands (e.g., VR hand controllers). The software algorithms of the digital controller component can initiate or modulate scent delivery or trigger changes in the VR environment based on the information received from the biometric sensor and/or virtual reality sensors. For instance, a virtual bottle of air freshener may move into the user's virtual hand when the sensor is sufficiently close to the bottle. The user's actions triggering those changes may include actions that symbolize the desired action (e.g., the user pressing a button on the sensor to indicate that the user wants to take a given object). Similarly, events in the VR environment in response to those actions may symbolize a given event (e.g., to represent that the user holds a bottle of air freshener in their hand, the virtual bottle moves with the user while hanging in the air next to them).

VR hardware can be either commercially available (e.g., OCULUS RIFT, HTC VIVE, SAMSUNG GEAR VR) or custom-built. In some embodiments, portable devices with a digital screen (e.g., a smartphone) are a part of the VR headset and are used to display VP environments. In other embodiments, VP hardware also includes commercially available or custom-built devices for tactile, auditory, and gustatory stimulation.

Biometric Sensor Component

As used herein, a biometric sensor component is a device that measures a user's biometric/physiological data or signals such as blood pressure, heart rate, skin temperature, galvanic skin response (sweating), muscle tension, brain activity (EEG), etc. and conveys such information to the digital controller component in real-time to provide the digital controller component with data pertinent to the user's physiological status. Devices for measuring various biometric/physiological factors are connected or coupled to the digital controller component to provide biofeedback to the digital controller component. It will be understood that when an element is referred to as being "attached" to, "connected" to, "coupled" with, "contacting", etc., another element, it can be directly attached to, connected to, or coupled with another element or may be indirectly attached to, connected to or coupled with another element by one or more intervening elements. By way of illustration, physiological sensors may be coupled to a digital controller component via USB cables, WIFI or BLUETOOTH®. In this respect, the above-referenced terms include wired or wireless communication between the devices.

The biometric sensor component can take a variety of forms. For example, such monitors can be in the form of earpieces, bracelets, wristwatches, rings, garments, gloves, headbands, hats, wearable digital skin or patches. In one embodiment, the biometric sensor component is an object worn on the skin. Since the hand has a special individual, intensive subcutaneous blood vessel pattern, in some embodiments, the monitor is a bracelet, wristwatch, ring or glove. Because the ear region is located next to a variety of "hot spots" for physiological an environmental sensing, including the tympanic membrane, the carotid artery, the paranasal sinus, etc., in some cases an earpiece monitor takes preference over other forms. Earpiece monitors can take the form of a hearing aid, an earplug, an entertaining speaker, the earpiece for an IPOD®, WALKMAN®, or other entertainment unit, a commercial headset for a phone operator, an earring, a gaming interface, or the like. In another embodiment, biometric sensor could be a remote sensor (e.g. Radio-frequency based biometric sensors (Adib, et al. (2015) *ACM Trans. Graph.* 34(6) Article 219).

The biometric sensor component can take advantage of commercially available open-architecture, ad hoc, wireless paradigms, such as BLUETOOTH®, WI-FI, or ZigBee and may be configured to transmit information wirelessly to the digital controller.

The biometric sensor component may contain a plurality of sensors for measuring or monitoring a user's physiological responses. The term "physiological" refers to matter or energy of or from the body of a creature (e.g., humans, animals, etc.). In embodiments of the present invention, the term "physiological" is intended to be used broadly, covering both physical and psychological matter and energy of or from the body of an organism. However, in some cases, the term "psychological" is called-out separately to emphasize aspects of physiology that are more closely tied to conscious or subconscious brain activity rather than the activity of other organs, tissues, or cells. The term "physiological state" is used herein to refer to the physiological status of a user or more particularly the physical, psychological, metabolic, emotional, mental, cognitive and/or pathophysiological status of the user.

Each physiological sensor of the biometric sensor component is configured to detect and/or measure one or more of the following types of physiological information: heart rate, skin conductance level, galvanic skin response or skin conductance response, pulse rate, breathing rate, blood flow, heartbeat signatures, metabolism, blood pH level, physical and/or psychological stress levels and/or stress level indicators, biochemistry, position and/or balance, body strain, neurological functioning, brain activity, brain waves, blood pressure, cranial pressure, hydration level, auscultatory information, skin and/or core body temperature, facial emotions, eye muscle movement, body movement, geolocation, blood volume, inhaled and/or exhaled breath volume, inhaled and/or exhaled breath rate, physical exertion, exhaled breath physical and/or chemical composition, psychological mood, hunger and/or thirst, hormone type and/or concentration, cholesterol, lipids, reflex response, electromyography (EMG) signals, electroencephalography (EEG) signals, sexual arousal, mental and/or physical alertness, sleepiness, response to external stimuli, swallowing volume, swallowing rate, sickness, voice characteristics, voice tone, voice pitch, voice volume, vital signs, head position or tilt, allergic reactions, inflammation response, auto-immune response, water content of the blood, pheromones, internal body sounds, digestive system functioning, healing response, stem cell regeneration response, functional near-infrared spectroscopy signals, salivary cortisol and amylase, sweat composition and/or other physiological information. Accordingly, the biometric sensor can include, but is not limited to, a respiration sensor, an electro-dermal activity (EDA) sensor, a photoplethysmography (PPG) sensor, an electrocardiography (ECG) sensor, an electroencephalography (EEG) sensor, an electromyography (EMG) sensor, an eye-tracker, an accelerometer, a gyroscope, and/or a temperature sensor.

A physiological sensor may include an impedance plethysmograph for measuring changes in volume within an organ or body (usually resulting from fluctuations in the amount of blood or air it contains). For example, the biometric sensor component may include an impedance plethysmograph to monitor blood pressure in real-time.

Pulse oximetry is a standard noninvasive technique of estimating blood gas levels. Pulse oximeters typically employ two or more optical wavelengths to estimate the ratio of oxygenated to deoxygenated blood. Similarly, various types of hemoglobin, such as methemoglobin and carboxyhemoglobin can be differentiated by measuring and comparing the optical absorption at key red and near-infrared wavelengths. Additional wavelengths can be incorporated and/or replace conventional wavelengths. For example, by adding additional visible and infrared wavelengths, myoglobin, methemoglobin, carboxyhemoglobin, bilirubin, $SpCO_2$, and blood urea nitrogen (BUN) can be estimated and/or monitored in real-time in addition to the conventional pulse oximetry $SpO_2$ measurement.

Blood hydration can also be monitored optically, as water selectively absorbs optical wavelengths in the mid-IR and blue-UV ranges, whereas water can be more transparent to the blue-green wavelengths. Thus, the same optical emitter/detector configuration used in pulse oximetry can be employed for hydration monitoring. However, mid-IR or blue optical emitters and detectors may be required. Additionally, monitoring the ratio of blue-green to other transmitted or reflected wavelengths may aid the real-time assessment of blood hydration levels. Blood hydration can also be monitored by measuring changes in capacitance, resistance, or inductance in response to varying water-content in the skin tissues or blood. Similarly, hydration can be estimated by monitoring ions extracted via iontophoresis across the skin. Additionally, measuring the return velocity of reflected sound (including ultrasound) entering the head can be used to gauge hydration. These hydration sensors can be mounted anywhere within or along biometric sensor component. It should be noted that other hydration sensors can also be incorporated.

A variety of techniques can be used for monitoring blood metabolites. For example, glucose can be monitored via iontophoresis at the surface of the skin combined with enzyme detection. Blood urea nitrogen (BUN) can be monitored by monitoring UV fluorescence in blood (through the skin) or by monitoring visible and mid-IR light absorption using the pulse oximetry approach described above. Various ions such as sodium, potassium, magnesium, calcium, iron, copper, nickel, and other metal ions, can be monitored via selective electrodes following iontophoresis through the skin.

Cardiopulmonary functioning can be evaluated by monitoring blood pressure, pulse, cardiac output, and blood gas levels. Pulse rate and intensity can be monitored through pulse oximetry (described above) as well as by sensing an increase in oxygenated blood with time. Pulse rate and blood flow may also be evaluated through impedance measurements via galvanometry near a blood vessel. Additionally, pulse rate and blood flow may be evaluated through a fast-response thermal energy sensor, such as a pyroelectric sensor. Because moving blood may temporarily increase or decrease the localized temperature near a blood vessel, a pyroelectric sensor will generate an electrical signal that is proportional to the total blood flow in time.

Blood pressure can also be monitored. According to some embodiments of the present invention, a digital blood pressure meter is integrated into the biometric feedback device. A compact clip containing actuators and sonic and pressure transducers can be placed on the skin, and systolic and diastolic pressure can be measured by monitoring the pressure at which the well-known Korotkoff sound is first heard (systolic), then disappears (diastolic). This technique can also be used to monitor intra-cranial pressure and other internal pressures. Blood pressure may also be measured by comparing the time between pulses at different regions of the body.

Electrodes can also be utilized to monitor blood gases diffused through the skin, giving an indication of blood gas metabolism. For example, a compact Severinghaus electrode can be used for the real-time monitoring of $CO_2$ levels in the blood. These Severinghaus-type electrodes can also be used to monitor other blood gases besides $CO_2$, such as oxygen and nitrogen.

Monitoring neurological functioning can be accomplished via electrodes. When such electrodes are placed along the scalp, this process is described as electroencephalography, and the resulting data is called an electroencephalogram (EEG). These electrodes can be either integrated into or connected to the biometric feedback device. For example, an earlobe clip can be modified to conform with EEG electrodes or other electrodes for measuring brain waves or neurological activity. For monitoring neurological functioning, a temple earpiece may also be used. Electrodes may be positioned in a temple earpiece region near the temples of a user for direct contact with the skin. In some embodiments, direct contact is not necessary, and the neurological functioning can be monitored capacitively, inductively, electromagnetically, or a combination of these approaches. In some embodiments, brain waves may couple with low frequency acoustical sensors integrated into an earpiece module.

A person's body motion and head position can be monitored by integrating a motion sensor into the biometric feedback device. Two such compact motion sensors include gyroscopes and accelerometers, typically mechanical or optical in origin. In some embodiments, an accelerometer may be composed of one or more microelectromechanical systems (MEMS) devices. In some embodiments, an accelerometer can measure acceleration or position in two or more axes. When the head is moved, a motion sensor detects the displaced motion from the origin.

The number of eye blinks performed over a certain period of time constitutes the so-called spontaneous blink rate (SBR). A contact lens sensor (e.g., Triggerfish; Sensimed AG, Lausanne, Switzerland) can be used to measure changes in ocular circumference and corneal curvature at the corneoscleral junction secondary to changes in intraocular pressure. Measurements from the CLS are obtained in electronic units of voltage (mV) via dilatation of the strain gauge (Gisler, et al. (2015) *Transl. Vis. Sci. Technol.* 4(1):4). Alternatively, a light emitter/detector device (e.g., using infrared light) can be used to monitor eye movement and blinking. See, e.g., U.S. Pat. No. 6,542,081.

Body temperature, including core and skin temperature, can be monitored in real-time by integrating compact infrared sensors into the biometric feedback device. Infrared sensors are generally composed of thermoelectric/pyroelectric materials or semiconductor devices, such as photodiodes or photoconductors. Thermistors, thermocouples, and other temperature-dependent transducers can also be incorporated for monitoring body temperature. These sensors can be very compact and thus can be readily integrated into the biometric feedback device.

Breathing or respiration characteristics can be monitored via auscultatory signal extraction. In some embodiments, an acoustic sensor or radar sensor (e.g., XeThru, Novelda AS) is used to sense sounds associated with breathing. Signal processing algorithms are then used to extract breathing sounds from other sounds and noise. This information is processed into a breathing monitor, capable of monitoring, for example, the intensity, volume, and speed of breathing. Another method of monitoring breathing is to employ pressure transducers. Changes in pressure inside or near the ear associated with breathing can be measured directly and, through signal processing, translated into breathing monitor. Similarly, optical reflection sensors can be used to monitor pressure by monitoring physical changes in the skin or tissues in response to breathing. For monitoring the physical changes of the tympanic membrane in response to breathing, and hence ascertaining breathing rate, an optical signal extraction approach may be employed. At least one color sensor, or colorimetric sensor, can be employed to monitor changes in color associated with breathing and other health factors.

Physical activity and metabolism can be monitored using a core temperature sensor, an accelerometer, a sound extraction methodology, a pulse oximeter, a hydration sensor, and the like. These sensors can be used individually or in unison to assess overall caloric metabolism and physical activity. For example, a sound extraction methodology can be used to extract sounds associated with swallowing, and this can give an indication of total food volume consumed. Additionally, a core temperature sensor, such as a thermopile, a pyroelectric sensor, a thermoelectric sensor, or a thermistor, or a tympanic membrane extraction technique, can be used to assess metabolism. In one case, the core temperature is compared with the outdoor temperature, and an estimate of the heat loss from the body is made, which is related to metabolism.

In addition, skin conductance can be measured using electrodes; facial emotions can be measured using electrodes (electromyography) or a simple facial camera (e.g., using Ekman and Friesen's Facial Action Coding System; see Ekman, et al. (1980) *J. Personal. Social Psychol.* 39:1125-34); body strain can be measured using strain gauges or electrodes; eye movements/blinks/pupil dilation can be tracked using infrared sensors (e.g., Tobii Pro Glasses; Tobii Technology, Inc., Falls Church, VA); DNA based biosensors can be used to analyze chemicals in exhaled breath (see, e.g., Ping, et al. (2016) *ACS Nano* 10(9):8700-8704); and voice analysis can be done using a simple microphone (e.g., Emotions Analytics; Beyond Verbal Communications, LTD, Tel Aviv, Israel).

Ideally, the physiological sensor of the biometric sensor component measures heart rate, blood pressure, the electric activity of the brain, respiration, skin conductance, and/or body temperature. Preferably, the biometric sensor component includes a respiration sensor. In accordance with this aspect, a digital control component triggers scent delivery only during the inhalation phase of the respiration cycle based on the information received from the respiration sensor. In one embodiment, the respiration sensor is a belt, worn around the user's chest, with a transducer that measures changes in the thoracic or abdominal circumference or the user. In another embodiment, the respiration sensor is a pressure transducer that is connected to a nasal cannula and thus detects changes in the direction and intensity of airflow in the user's nose.

The biometric sensor component can be a commercially-available device, e.g., a FITBIT, adapted for use in the system and method of this invention or a custom-built device that measures the user's biometric signals.

Wearable Scent Delivery Component

The invention features a wearable scent delivery device that includes one or more removable or detachable cartridges with liquid or solid odorants, means for vaporizing and delivering the odorants, and means for controlling odorant concentration in the emitted vapor. Ideally, the delivery device is controlled by the digital controller component (e.g., a computer or smartphone) via a wired (e.g., USB) or a wireless (e.g., BLUETOOTH) digital communication method. Upon receiving a digital trigger signal, the device emits odors.

The scent delivery component (140) can be in the same housing as the virtual reality component (110), biometric readout device (130), and/or digital controller (150), or be in a separate housing. In general, the scent delivery device includes a portable housing adapted to be worn by a user in close proximity to the nose of the user; and a means for selectively generating scent housed in said housing, wherein the scent travels by diffusion (active and/or passive diffusion) to the user's nose. The term scent as used in the specification and claims means the effluent that is perceived by the olfactory organs.

The phrase "housing adapted to be worn by the user" as used herein means a hat, headset (e.g., the VR headset), shoulder harness or neck harness, necklace, athletic gear, fashion accessory, smart clothing or jewelry, which is worn by the user; or adhesive or magnet support which is affixed to the skin of the user or wearable digital skin, thereby allowing the scent generating means to be placed in close proximity to or in the user's nose. With reference to jewelry, it is contemplated that the jewelry could adorn the nose, for example as a nose ring or stud that attaches to or pierces the nose. Jewelry that overlays the nose in a hidden, embedded, subtle or bold way could also be used. Similarly, jewelry that attaches, pierces or overlays the face or other parts of the head or upper body is also envisioned. The phrase "close proximity to the user's nose" means about 90 inches, 80 inches, 70 inches, 60 inches, 50 inches, 40 inches, or preferably 30 inches or less (75 cm or less), which is an acceptable distance to allow the scent to reach the nose of the user by diffusion. In one embodiment, the odor stream is shaped like a narrow plume directed at the user's nose (FIG. 2A, FIG. 2B), which maximizes the odor impact. As a result, small amounts of scent are delivered, thereby minimizing the problem of cross-contamination between scents or of scents lingering longer than intended. This also facilitates precise control over onset and offset of the odor stream.

Figure 2A:
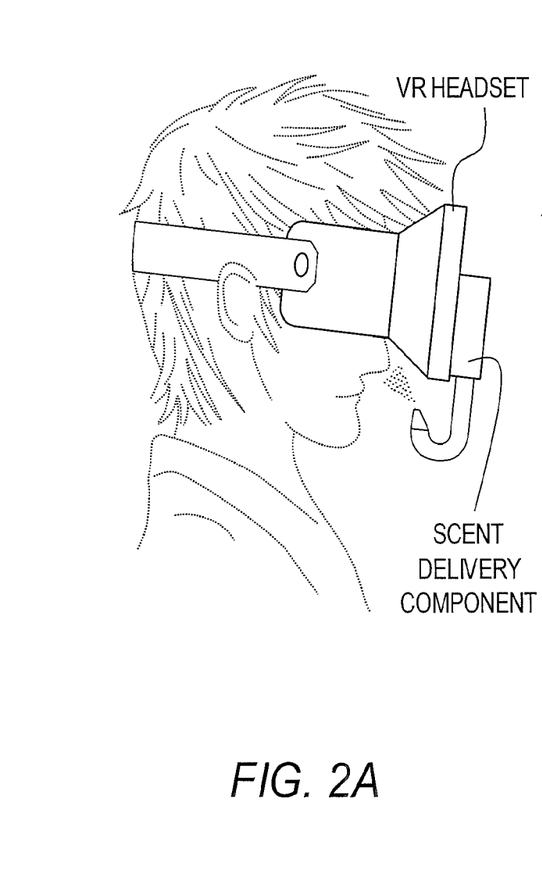
FIG. 2A shows integration of scent delivery component with virtual reality component.
Figure 2B:
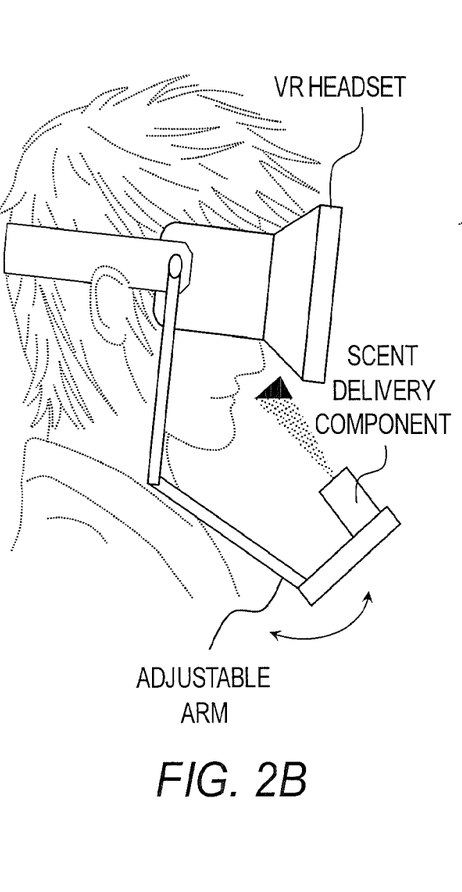
FIG. 2B shows a scent delivery component with an adjustable arm for positioning directly below the user's nose.
Figure 2C:
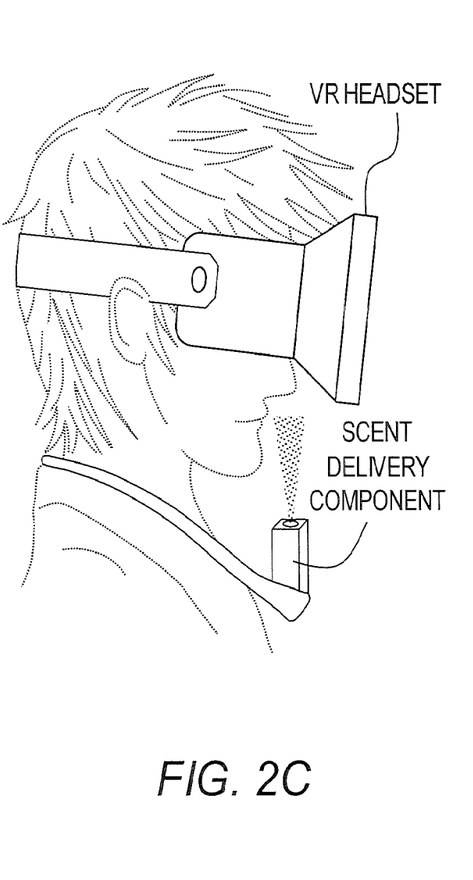
FIG. 2C shows a scent delivery component worn as an article on the neck.

In some embodiments, the scent delivery component is detachably fixed to an adjustable head band worn by the VR user and is positioned directly below the user's nose (FIG. 2A). In another embodiment, the device is worn as a headset with an adjustable arm for positioning scent, delivery directly below the user's nose (FIG. 2B). In a further embodiment, the device is an article (e.g., collar or necklace) worn on the user's neck (FIG. 2C). In an alternative embodiment, the device is physically connected to the VR headset via a connector (e.g., USB) in a plug and play configuration. In certain embodiments, the scent component is entirely embedded into the VR headset.

Diffusion is a recognized natural phenomenon of the spreading or scattering of material. In the present invention, diffusion moves the scent from the scent generating component to the nose by the ambient air, or the natural flows of air that surrounds the user and the scent delivery device. Optionally, the flow of scent by diffusion can be assisted by use of a heater or a fan or a micropump. The fan employed in the present invention is small and is not intended to cool the user but to provide a current or direction to the air to aid in the movement of scent to the nose.

The means for selectively generating scent is preferably a small and light weight scent generating device. The scent generating device can take on a number of embodiments. For example, in one embodiment, the scent generating device includes a support affixed to the housing; one or more scent sources mounted on the support to selectively provide scent to the user's nose; and a release mechanism for selectively releasing scent from the scent sources directly to the user's nose. In some embodiments, the support is a silicon chip, disk, or thin plastic film, one side of which is affixed to the housing, the other side of which allows for scent to be released.

In this first embodiment of the scent generating device, the release mechanism for selectively releasing scent to the user's nose acts on the scent source to release the scent. The release mechanism includes a micro-mechanical system (MEMS), tape or other means, to release the desired scent to or in the nares. The release mechanism can be activated manually by the electronics of the PED or by its own electronics.

The scent source can be of many types for this first embodiment. The scent source can be a micro-container, microcapsule or cavity which contains scent molecules in a liquid or gel form. In this embodiment, the scent source holding the scent molecules is normally, closed, however, when the release mechanism is activated, the scent source is selectively opened to allow the scent molecules to diffuse into the nares towards the olfactory nerve receptors.

The scent source can also be scent molecules which are microencapsulated in heat-sensitive capsules. Under conditions of normal environmental temperatures, the microcapsules remain intact and the scent molecules are contained within. They cannot be sensed by the olfactory receptors. However, the release mechanism selectively heats the microcapsules so that the desired scent source is heated and a certain portion of the scent molecules are liberated and allowed to diffuse to the olfactory receptors. As soon as the microcapsules cool, no more scent molecules are liberated from the microcapsules.

In a second embodiment of the scent generating device, one or more scent sources are mounted on the scent delivery component housed in said housing and the delivery device selectively delivers scent from the scent sources directly to the user's nose. In accordance with this embodiment, the scent sources are placed near or adjacent to the nares one at a time, or more than one at a time. The delivery component moves the scent source to the user's nose. The scent sources in this second embodiment are the same as those for the first embodiment.

In this second embodiment, the scent source holding the scent molecules is normally closed, however, when it is moved into position adjacent to the nares, it is selectively opened to allow the scent molecules to diffuse into the nares towards the olfactory nerve receptors. Where microencapsulated scent molecules are used, these molecules are moved under the nose and then heated or activated to release the scent. The delivery device in accordance with this embodiment of the invention can be a disk or endless belt rotatably mounted in the house, wherein scent containers are mounted on the disk or belt; one or more tubes or capillary tubes which are bundled together and attached to said housing, wherein one end of the tubes is placed in communication with the scent sources; or a matrix in said housing in which each of said scent containers are held. See U.S. Pat. No. 7,437,061, incorporated herein by reference in its entirety, for various configurations of scent delivery device. In any embodiment, a fan or heater can be employed to assist diffusion and provide a current of air on which the scent molecules travel to the nose.

For digital control of the scent, a microprocessor may be attached by wires to a heater. The microprocessor can be controlled by the electronics in the digital controller or by a separate device (e.g., the biometric readout device), which communicates in a conventional way to the microprocessor to control the scent that is released. A heater not only causes the release of scent from scent source or microcapsule, but can also cause an air current by the fact that the air is heated to above ambient temperatures, thereby causing an upward flow of air.

Instead of a heater to activate release of scent, a mechanism can be employed to open and close caps or lids of the scent sources. Specifically, each of the scent sources can be capped with a micromechanical cap, a microelectrical cap, or a molecular cap. These different types of caps are made in a conventional manner and operate in a conventional way to open and close the scent source, thereby controlling the release of scent. A heater can still be employed to promote movement of the scent molecules and provide a current of air to carry the scent to the user's nose. In accordance with this embodiment, a microprocessor is used to control the opening and closing of the caps.

In certain embodiments of this invention, the support is a silicon chip into which capillary tubes and a plurality of microcapsules or cavities (i.e., scent sources) have been etched into the chip. The tubes, often referred to as nanochannels, are typically on the order of a few microns (micrometers) in diameter. They are able to transport scent molecules because the scent molecules are smaller than the diameter of the nanochannels. Each of the plurality of microcapsules or cavities contains a small quantity of a concentrated scent-producing substance and may have a cap to prevent unintended release of the scent. Alternatively, the scent-producing substance may be a solid. Preferably, the microcapsules or cavities are arranged in a matrix grid on the microchip such that a grid of electrodes can be overlaid on or electrically connected to the microcapsules or cavities and connected by wires or other conductors to the microprocessor. In some embodiments, the microprocessor is housed on the microchip.

In use, the microprocessor energizes the proper horizontal and vertical electrodes for the microcapsule or cavity containing the selected scent. A heating element heats up the specific microcapsule located at the intersection of the electrodes to release the scent. Alternatively, a catalyst or other chemical could be released or electrically activated to generate the desired scent. Alternatively, a piezoelectric cap may be positioned over each scent cavity, the cap opening when electrically energized to release the scent. It will be recognized that more than one microcapsule or cavity can be opened at one time thereby allowing for the synthesis of scent by the device itself.

As further examples, the scent delivery device can encompass e-spray technology such as the e-spray olfactometer disclosed in PCT/US2017/018270); a surface acoustic wave (SAW) atomizer (see, e.g., U.S. Pat. Nos. 8,480,010 or 5,996,903); a multijet pulse-controlled fluid delivery system (see, e.g., U.S. Pat. No. 6,390,453) or ultrasonic vibrations (see, e.g., WO 2007/026872) to disperse a scent.

As used herein, the term "processor" or "microprocessor" refers to a device that takes one form of information and converts this information into another form, typically having more usefulness than the original form. For example, in this invention, a processor (e.g., of the digital controller) may collect raw physiological or environmental data from various sensors and process this data into a meaningful assessment such as pulse rate, blood pressure, or air quality and, based upon this assessment, direct the scent delivery component to release one or more scents. The connection and programming for the communication between the scent delivery device, biometric readout device and digital controller are done in a conventional manner using conventional electronics such as wired (e.g., USB, Ethernet, coax etc.) and wireless (e.g., BLUETOOTH, Infrared, wireless, radio transmitter) approaches.

Figure 3:
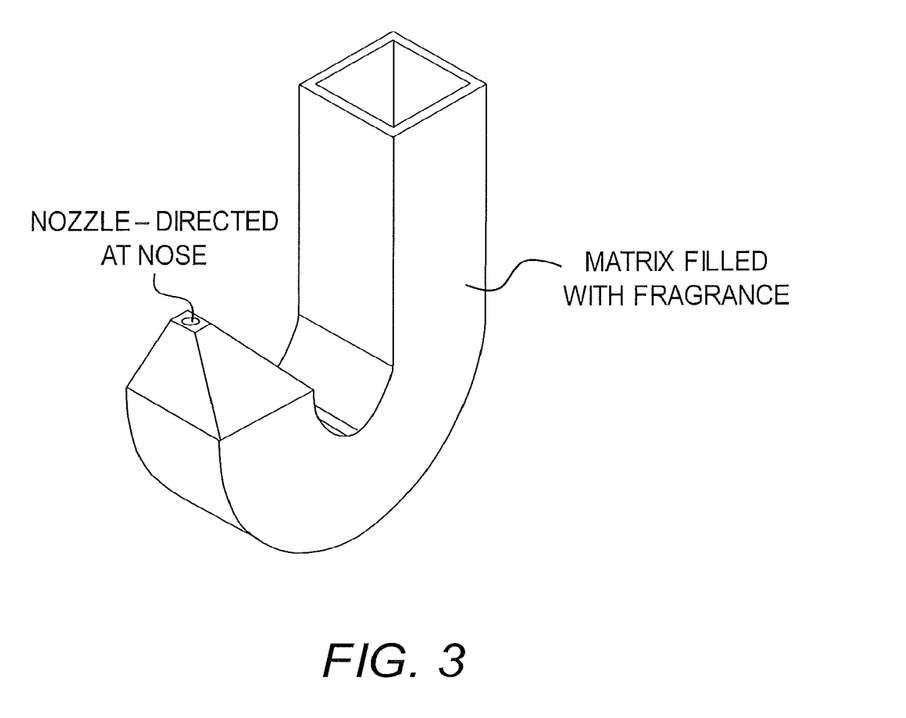
FIG. 3 illustrates the structure of a cartridge of use in a virtual reality headset.

In certain aspects, the wearable scent delivery component is detachably fixed to the virtual reality headset and includes (a) a detachable cartridge which includes magnetic connectors for ease of use and changing the cartridges; (b) an air-over-substrate method of delivering scent for precise control over delivery using a custom designed onboard electronic controller board; (c) a dual micro-pump system, one for fragrance delivery and other as a vacuum pump to remove residual odor contamination, if any; (d) a cartridge designed with an onboard charcoal filter to prevent contamination of the system via passive diffusion; and/or (e) a cartridge outlet designed as a nozzle with a small diameter to deliver a pleasant scent experience to the nose and to prevent passive diffusion. In certain embodiments, the cartridge has the structure presented in FIG. 3.

Digital Controller Component

The digital controller component is in communication with the virtual reality component, the wearable scent delivery component and, in certain aspects the biometric sensor(s), to synchronize delivery of a scent with pre-specified events in the virtual environment, e.g., appearance of a flower or other object in the virtual environment. In particular, the digital controller delivers the scent based on the user's interaction with the product or object in the virtual reality environment, e.g., leaning toward a flower or other object in the virtual environment. When used in combination with a biometric sensor component, data from the biometric sensor component is sent to the digital controller component, which runs software algorithms to analyze biometric data and convey information to the scent delivery component to provide a scent-based experience to a user in a virtual reality environment.

The digital controller component can be in the same housing as the scent delivery component, virtual reality component and/or biometric sensor component. Alternatively, the digital controller can be in a housing separate from the scent delivery component, virtual reality component and/or biometric sensor component. When in a separate housing, the digital controller can be located within the vicinity of the subject or be in a remote location. The digital controller can take the form of "portable electronic device" or "PED" and/or a computer. The phrase "portable electronic device" or "PED" as used herein means a personal digital assistant (PDA), portable television, portable cassette player, portable compact disc (CD) player, portable digital versatile disc (DVD) player, portable radio, desktop computer, laptop or hand-held computer, hand-held electronic game device, mobile or wireless telephone, and the like. In one embodiment, the digital controller device is a laptop worn by the user in a backpack.

The digital controller component is configured to receive information from and send information to the virtual reality component and/or sensors of the biometric sensor component. In particular, the functions performed by the software algorithms, which are installed on the digital controller component, include: (a) sending commands to the VR hardware (i.e., headset, sensors, and hand controllers) to render the visual and auditory component of the VR environment; (b) continuous tracking of the VP user's location and actions by processing data that was communicated by the VR hardware; (c) processing data that was measured by the biometric sensors attached to the user (e.g., heart rate, respiration, skin conductance, temperature, pupil dilation, etc.); (d) altering the virtual reality environment (e.g., the amount of light; the appearance, number, and position of virtual objects; the timing of light onset and offset; and/or the onset, duration, and offset of one or more virtual object(s)) when one or more predefined criteria are met; and/or (e) initiating or stopping scent delivery or altering scent delivery parameters (e.g., amount, duration or type of odorant) when said criteria are met. These criteria can be based on one or more of the following: the user's actions in a VR environment (e.g., gazing at or moving toward an object); the user's location in a VR environment in relation to other virtual objects (e.g., when the user is within a certain distance of an object); time of day or time that elapsed since a certain action by the user (e.g., five minutes after the beginning of his/her VR experience); changes in the user's physiological state (e.g., as determined from the user's biometric data); and/or the user's proficiency when performing an activity (e.g., navigating a virtual maze or flying a virtual plane). For instance, the algorithms may cause the scent delivery device to increase odorant concentration in its air flow as the VR user approaches a virtual object that is intended to smell. Alternatively, the algorithms may cause the scent delivery device to increase the air flow with a relaxing scent as long as the user's heart rate exceeds a pre-defined value. Alternatively, the virtual environment may change depending on the user's biometric data. For instance, the difficulty of navigating the environment may vary depending on the biometric indices of mental load (or other indices) or the user's proficiency in navigating the virtual environment. In another instance, a fear-inducing virtual stimulus may disappear once the user's biometric data indicates an elevated level of anxiety.

As illustrated in FIG. 1, software algorithms may consist of two separate modules (e.g., a Unity program and a Java program), wherein the VR content creation program communicates with VR hardware and the scent delivery module communicates with the scent delivery component. In another embodiment, the same algorithms may communicate with both devices. Communication between all devices in the scent delivery system can be achieved through wires or wirelessly using a wide range of various protocols (e.g., USB, BLUETOOTH, TCP/IP, or UDP)

Use of the System

The system of this invention finds particular use in integrating scent into a wide range of VR environments to provide a platform for conducting "in-context" evaluation of fragrance products or objects. Accordingly, the invention also provides a method for evaluating a fragrance product or object by presenting a virtual fragrance product or object to a user in a virtual reality environment; collecting biometric data from the user while presenting the virtual fragrance product or object to the user; collecting biometric data from the user while presenting the virtual fragrance product or object to the user; and delivering a scent to the user, wherein scent delivery is synchronized with; the user's interaction with the virtual fragrance product or object in the virtual reality environment, the user's position in relation to the virtual fragrance product or object in the virtual reality environment, changes in the user's physiological state, time of day or time that elapsed since the start of the user's experience in the virtual reality environment, and/or changes in the virtual fragrance product or object in close proximity to the user in the virtual reality environment.

In some aspects, the system of this invention is used to add a scent as another sensory dimension in a VR environment. Accordingly, this invention provides a method for introducing scent as another sensory dimension to a virtual reality environment by providing a system of the invention in a virtual reality movie, advertisement or gaming experience; and delivering a scent to the user at a pre-specified event in the virtual reality environment. By way of illustration, the system can be incorporated into a VR movie experience with scent as part of a 4D experience, e.g., somebody walking in a field of lavender plants and lavender scent is introduced to enhance the user's experience. As another example, internet-based advertisements can be adapted with scent, e.g., chocolate advertisement with the smell of chocolate. Further, the system can be adapted for use in interactive gaming with scent as a passive background to augment the gaming experience. For example, scent may be used as a trigger in a game to, e.g., alert the user of certain obstacles or tasks in the game, or provide a scent experience when a user interacts with an object in the gaming environment.

Ideally, the system and method of this invention provides a scent in a fully integrated and natural manner thus creating a fully immersive experience that simulates in-context consumer testing of fragrance materials. By way of illustration, the method and system of the invention can be used to evaluate fragrance performance across a fabric wash cycle at the point of purchase, immediately after washing the fabric, after drying it, while folding it, and while wearing it. The invention also extends to a range of other applications including but not limited to entertainment, destination tourism, e-commerce, product design, cognitive training/neurogaming, learning, gaming, advertising, destination tourism, wellness tourism, skill training, emotional, wellness, health and other well-being applications.

A fragrance product or object is used in the broadest sense and refers to any product, product group, services, communications, entertainment, environments, organizations, systems, tools, and the like. For example, an example of a product group is personal and household products, such as used by a person, family or household. Examples of a representative, and non-limiting list of product categories within the personal and household product group includes antiperspirants, baby care, colognes, commercial products (including wholesale, industrial, and commercial market analogs to consumer-oriented consumer products), cosmetics, deodorants, dish care, feminine protection, hair care, hair color, health care, household cleaners, laundry, oral care, paper products, personal cleansing, disposable absorbent articles, pet health and nutrition, prescription drugs, prestige fragrances, skin care, foods, snacks and beverages, special fabric care, shaving and other hair growth management products, beauty treatment, and spa treatment. A variety of product forms may fall within each of these product categories.

Exemplary products within the laundry category include detergents (including powder, liquid, tablet, and other forms), bleach, conditioners, softeners, anti-static products, and refreshers (including liquid refreshers and dryer sheets). Exemplary products within the oral care category include dentifrice, floss, toothbrushes (including manual and powered forms), mouth rinses, gum care products, tooth whitening products, and other tooth care products. Exemplary feminine protection products include pads, tampons, interlabial products, and pantiliners. Exemplary baby care products include diapers, wipes, baby bibs, baby change and bed mats, and foaming bathroom hand soap. Exemplary health care products include laxatives, fiber supplements, oral and topical analgesics, gastro-intestinal treatment products, respiratory and cough/cold products, heat delivery products, and water purification products. Exemplary paper products include toilet tissues, paper towels, and facial tissues. Exemplary hair care products include shampoos, conditioners (including rinse-off and leave-in forms), and styling aids. Exemplary household care products include sweeper products, floor cleaning products, wood floor cleaners, antibacterial floor cleaners, fabric and air refreshers, and vehicle washing products. Skin care products include, but are not limited to, body washes, facial cleansers, hand lotions, moisturizers, conditioners, astringents, exfoliation products, micro-dermabrasion and peel products, skin rejuvenation product, anti-aging products, masks, UV protection products, and skin care puffs, wipes, discs, clothes, sheets, implements and devices (with or without skin care compositions). Other product groups include but are not limited to sports equipment, entertainment (books, movies, music, etc.), vision, and in-home-consumed medical and first aid, among others.

In accordance with the method and system of this invention, the scent(s) is triggered automatically based on a user's interaction with the product or object in the virtual environment, as determined by, e.g., the user leaning toward the object, picking the object up and biometric signals. Additionally, the system and method can also be used to develop immersive paradigms to measure the functional impact of the scent(s), e.g., stress relief, anxiety relief, focus etc. Accordingly, in certain aspects, the invention provides a method for evaluating consumer behavior by providing a system of the invention in a virtual reality environment (e.g., a retail store environment); delivering a scent to the user at a pre-specified event in the virtual reality environment; and obtaining the user's biometric data in response to the scent. In certain embodiments, the method further includes the step of measuring the user's emotional (e.g., preference, liking, pleasantness etc.), psychophysical (e.g., intensity), and/or neurophysiological (e.g., EEG, heart-rate, etc.) response to the scent. The user's response can include biometric data from the subject as well as a verbal output from the user.

By combining audiovisual stimulation with olfactory stimulation, the present invention enables the creation of VR environments that simulate the real world more accurately than VR environments without scents. Scents have also shown to increase the user's feeling of presence in the VR environments, thus adding to their realism (Munyan, III, et al. (2016) *PLOS One* 11(6):e0157568). Due to the enhanced realism of these environments, "in-context" evaluations of fragranced consumer products can be conducted by trained or naïve respondents (termed "panelists" and "consumers" respectively). Traditional product testing is usually conducted in settings (e.g., sensory booth) that are devoid of context in which the tested product is ordinarily used and thus the performance differences obtained in these evaluations may not translate to consumer perceived benefit in real-world use. Alternatively, evaluations are conducted by sending products to a consumer's home for in-context evaluations. These evaluations lack the necessary controls and may suffer from non-compliance with the test protocol. Therefore, the "immersive" product evaluations that utilize VR environments to provide contextual cues (e.g., virtual kitchen), while allowing researchers to control other parameters of the study, are ideally suited to overcome these drawbacks. Further, the ability to rapidly switch VR environments provides an efficient and cost-effective method to conduct product evaluations that involve multiple "touchpoints" (i.e., consumer interactions with the product) across various settings.

Figure 4A:
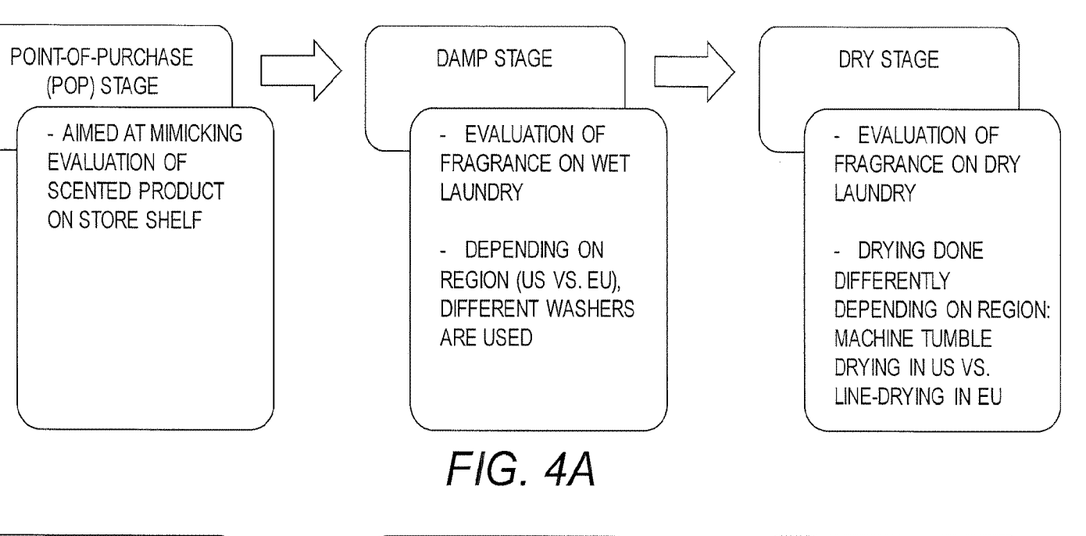
FIG. 4A and FIG. 4B respectively show stages of sensory performance testing of fragrances on fabric (Fabric Care category) and in body wash (Personal Care category) products.
Figure 4B:
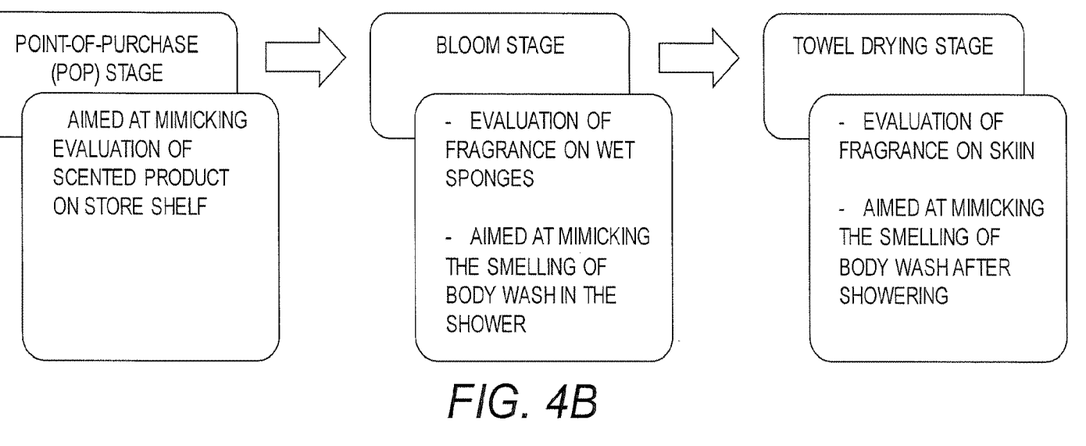

By way of illustration, a comprehensive evaluation of a product in the Fabric Care category (e.g., detergent or fabric conditioner) using the system and method of this invention can include the user's response to the product at the point of purchase, when smelling damp laundry, or when smelling dry laundry (FIG. 4A). To this end, the scent delivery component presents the scent to be evaluated to the consumer while the consumer samples the product in a virtual store (point-of-purchase), or after opening a washing machine in a virtual laundromat (damp stage), or after opening a virtual dryer or closet (dry stage). Regional differences in how clothes are washed or dried (e.g., line-drying vs. tumble-drying) can be easily accommodated by changing the VR scene. Similarly, for an evaluation of a Personal Care product (e.g., a body wash), the system and method of the invention can include the user's response to the product at the point of purchase, and during and after showering (FIG. 4B). To this end, the scent delivery component presents the scent to the consumer while the consumer samples the product in a virtual store (point-of-purchase) or bedroom (towel drying stage); or mixes it with water vapor while they see a virtual bathroom (bloom stage). The described use cases include stimulation of the auditory, visual and olfactory senses and, in some embodiments, tactile, and gustatory senses. Accordingly, the present device and system find use in VR systems for sensory and consumer evaluation, cognitive and brain training, entertainment, psychotherapy, and skills training.

What is claimed is:

1. A system comprising:
   (a) a virtual reality component configured to present a user with a product or object in a virtual reality environment;
   (b) a wearable scent delivery component configured to deliver a scent to the user in a plume directed at the user's nose;
   (c) a digital controller component in communication with (a) and (b); and
   (d) one or more biometric sensor components configured to obtain the user's biometric data and provide biofeedback to the digital controller component, wherein the one or more biometric sensor components comprise a photoplethysmography (PPG) sensor, an electrocardiography (ECG) sensor, an electro-dermal activity (EDA) sensor, an electroencephalography (EEG) sensor, an eye-tracker, or an electromyography (EMG) sensor;
   wherein said digital controller component alters the virtual reality environment and initiates, stops, or alters scent delivery depending on the user's interaction with the product or object, the user's location in the virtual reality environment, the user's movement in the virtual reality environment, time spent by the user in the virtual reality environment, and the user's biometric data.

2. The system of claim 1, wherein the one or more biometric sensor components further comprise a respiration sensor, an accelerometer, a gyroscope, or a temperature sensor.

3. The system of claim 2, wherein the respiration sensor detects the user's respiration cycle.

4. The system of claim 1, wherein the virtual reality component comprises a virtual reality headset.

5. The system of claim 4, wherein the wearable scent delivery component is detachably fixed to the virtual reality headset.

6. The system of claim 1, wherein the wearable scent delivery component comprises a detachable scent cartridge.

7. The system of claim 1, wherein the wearable scent delivery component comprises an adjustable arm for positioning directly below the user's nose.

8. The system of claim 1, wherein the wearable scent delivery component is an article worn on the user's neck.

9. The system of claim 1, wherein the wearable scent delivery component further comprises a micropump to direct the scent to the user's nose.

10. The system of claim 1, wherein the wearable scent delivery component comprises one or more removable cartridges for housing a solid scent-producing substrate.

11. The system of claim 1, wherein the eye-tracker detects the user's gaze direction, eye movement, and pupil diameter.

12. A method for evaluating a fragrance product or object comprising:
    (a) presenting a virtual fragrance product or object to a user in a virtual reality environment using the system of claim 1; and
    (b) collecting biometric data from the user while presenting the virtual fragrance product or object to the user.

13. A method for introducing scent as another sensory dimension to a virtual reality environment comprising:
    (a) providing a system of claim 1 in a virtual reality movie, advertisement or gaming experience; and
    (b) delivering a scent to the user at a pre-specified event in the virtual reality environment.

14. A method for evaluating consumer behavior comprising:
    (a) providing a system of claim 1 in a virtual reality environment;
    (b) delivering a scent to the user at a pre-specified event in the virtual reality environment; and
    (c) obtaining the user's biometric data in response to the scent.

* * * * *